(12) United States Patent
Kyle

(10) Patent No.: US 10,626,825 B2
(45) Date of Patent: Apr. 21, 2020

(54) BOTTOM FEED FUEL BOWL

(71) Applicant: K&N Engineering, Inc., Riverside, CA (US)

(72) Inventor: John Kyle, Riverside, CA (US)

(73) Assignee: K&N Engineering, Inc., Riverside, CA (US)

( * ) Notice: Subject to any disclaimer, the term of this patent is extended or adjusted under 35 U.S.C. 154(b) by 0 days.

(21) Appl. No.: 16/126,997

(22) Filed: Sep. 10, 2018

(65) Prior Publication Data
US 2019/0003424 A1 Jan. 3, 2019

Related U.S. Application Data

(63) Continuation of application No. 15/429,035, filed on Feb. 9, 2017, now Pat. No. 10,087,888, which is a continuation of application No. 14/508,239, filed on Oct. 7, 2014, now Pat. No. 9,581,111.

(51) Int. Cl.
F02M 5/00 (2006.01)
F02M 5/12 (2006.01)
F02M 5/16 (2006.01)
F02M 5/08 (2006.01)
B01D 19/00 (2006.01)

(52) U.S. Cl.
CPC ........... F02M 5/14 (2013.01); B01D 19/0073 (2013.01); F02M 5/08 (2013.01); F02M 5/16 (2013.01)

(58) Field of Classification Search
CPC ... F02M 5/14; F02M 5/08; F02M 5/16; B01D 19/0073
USPC ................................ 261/34.1, 72.1, DIG. 67
See application file for complete search history.

(56) References Cited

U.S. PATENT DOCUMENTS

| 4,737,319 A | 4/1988 | Saxby |
| 5,309,875 A | 5/1994 | Gault |
| 5,667,730 A | 9/1997 | Barfield |
| 9,404,442 B2 | 8/2016 | Laws |

Primary Examiner — Robert A Hopkins
(74) Attorney, Agent, or Firm — Rutan & Tucker LLP; Hani Z. Sayed

(57) ABSTRACT

An apparatus and method are provided for a fuel bowl to supply liquid fuel to a carburetor. The fuel bowl comprises a float chamber and a fuel inlet cavity which receives a fuel delivery insert. The fuel delivery insert receives a fuel inlet valve and comprises passages to direct incoming fuel to a bottom portion of the float chamber. A float comprises an elongate member rotatably hinged within a float cavity of the fuel delivery insert, such that the float rises according to a quantity of fuel within the float chamber. The fuel inlet valve supplies liquid fuel to the float chamber by way of the passages according to the operation of the float within the float chamber. A ventilation chamber allows air and fuel vapors to exit as liquid fuel enters the float chamber while preventing liquid fuel from entering into the carburetor.

14 Claims, 6 Drawing Sheets

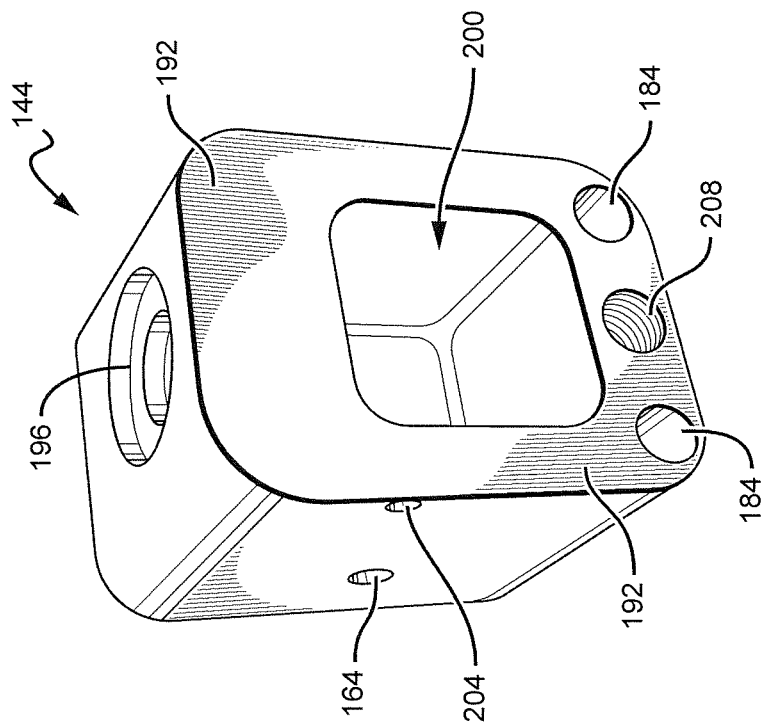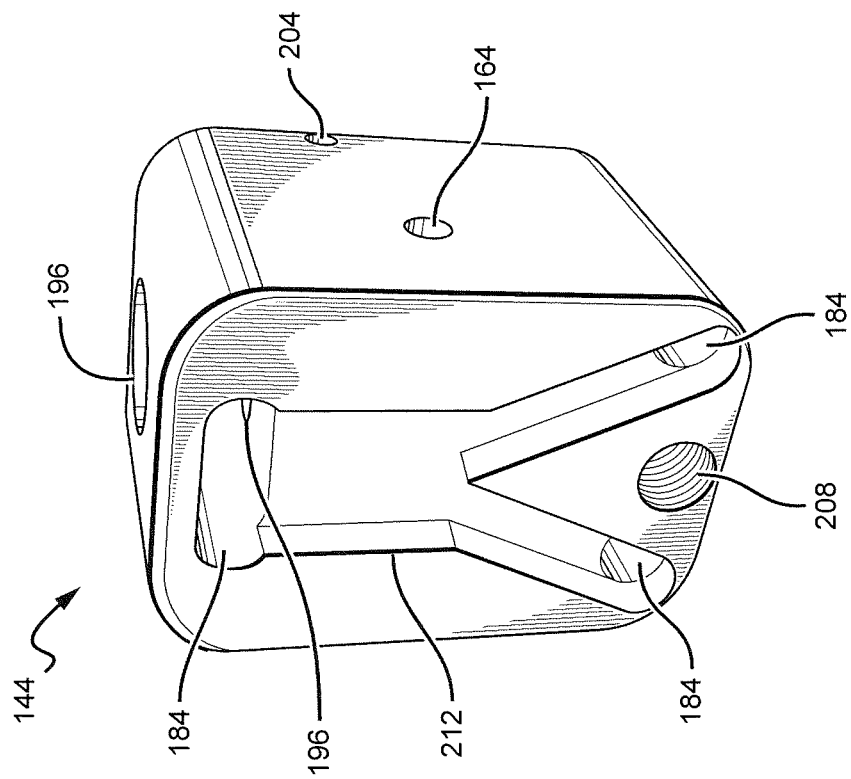

BOTTOM FEED FUEL BOWL

CROSS REFERENCE TO RELATED APPLICATION

This application is a continuation of, and claims the benefit of, U.S. patent application Ser. No. 15/429,035 filed on Feb. 9, 2017 and U.S. Patent Application, entitled "Bottom Feed Fuel Bowl," filed on Oct. 7, 2014, and having application Ser. No. 14/508,239, now issued as U.S. Pat. No. 9,581,111 on Feb. 28, 2017, the entirety of which being incorporated herein by reference.

FIELD

The field of the present invention generally relates to fuel systems. More particularly, the field of the invention relates to an apparatus and a method for an improved fuel bowl assembly to supply a carburetor with fuel.

BACKGROUND

A carburetor generally blends air and fuel for combustion within an internal combustion engine. Typically, a carburetor comprises an open pipe, or throat, through which air is drawn into an intake of an internal combustion engine, and a throttle valve to control the airflow through the carburetor. The throttle valve typically is of the butterfly variety, comprising a rotatable disk within the throat of the carburetor and in operative communication with a throttle control of the engine. The butterfly valve may be rotated within the throat between a first extremal position wherein the valve obstructs a large portion of the airflow into the intake and a second extremal position wherein the butterfly valve offers very little resistance to incoming air, thereby allowing a maximal airflow into the intake.

A Venturi positioned above the butterfly valve generally comprises a narrow section within the throat wherein airflow through the carburetor increases in speed. Fuel is introduced into the airflow through small holes at the narrowest part of the Venturi. Fuel flow into the airflow is adjusted by way of precisely calibrated orifices, referred to as jets, positioned within a fuel reservoir, called a fuel bowl. During operation, engine power and speed is controlled by way of the butterfly valve, whereby positioning the butterfly valve at the first extremal position limits the quantity of air and fuel introduced into the engine, and positioning the throttle valve at the second extremal position allows a maximal quantity of air and fuel into the engine.

The fuel bowl typically comprises a float chamber which maintains a quantity of fuel at near-atmospheric pressure, ready for use. The float chamber is constantly replenished by way of a fuel pump which supplies fuel through an inlet valve. An advantageous fuel level is maintained within the fuel bowl by way of a float controlling the inlet valve. As fuel is drawn into the engine through the Venturi, the quantity of fuel in the float chamber decreases, causing the float to drop within float chamber, thereby opening the inlet valve and allowing fuel to enter the float chamber. As the fuel level rises, the float rises within the float chamber until the inlet valve is closed. Generally, ventilation tubes are used to allow atmospheric pressure to be maintained in the float chamber as the fuel level changes. The ventilation tubes typically extend from the float chamber into the carburetor throat.

One drawback to conventional fuel bowls is that under some circumstances, such as during acceleration, fuel may slosh out of the float chamber and into the carburetor throat, thereby giving rise to engine performance problems. Another drawback is that conventional inlet valves are position at the top of the float chamber, thereby allowing fuel to enter at the top of the fuel bowl. When fuel enters at the top of the fuel bowl, the fuel may become aerated which fills the fuel bowl with fuel having a reduced density, thereby reducing engine performance. Still another drawback to conventional fuel bowls is that they are designed so as to have an airspace above the fuel level within the float chamber, which allows the fuel to slosh around within the float chamber, thus leading to aeration of the fuel within the fuel bowl. What is needed, therefore, is a fuel bowl which prevents aeration of the fuel within the float chamber.

SUMMARY

An apparatus and method are provided for a fuel bowl assembly to supply liquid fuel to a carburetor. The fuel bowl assembly comprises a rigid body comprising a float chamber, a fuel inlet cavity, and a mounting plate configured to fasten the fuel bowl assembly to the carburetor, such that the fuel bowl is in fluid communication with the carburetor. A fuel delivery insert is configured to be fastened within the fuel inlet cavity, the fuel delivery insert is configured to receive a fuel inlet valve and comprises at least one passage to direct incoming fuel to a bottom portion of the float chamber. A float comprises an elongate member rotatably hinged within a float cavity of the fuel delivery insert, such that the float rises according to a quantity of fuel within the float chamber. The fuel inlet valve supplies liquid fuel to the float chamber by way of the at least one passage according to the operation of the float within the float chamber. The float is biased toward the bottom portion of the float chamber by way of a spring operating on the elongate member. A ventilation chamber is in fluid communication with the float chamber and the carburetor, such that air is allowed to exit as liquid fuel enters the float chamber while preventing liquid fuel from entering into the carburetor.

In an exemplary embodiment, an apparatus for a fuel bowl assembly to supply liquid fuel to a carburetor comprises a rigid body comprising a float chamber, a fuel inlet cavity, and a mounting plate configured to fasten the fuel bowl assembly to the carburetor, such that the fuel bowl is in fluid communication with the carburetor; a fuel delivery insert configured to be fastened within the fuel inlet cavity, the fuel delivery insert configured to receive a fuel inlet valve and comprising at least one passage to direct incoming fuel to a bottom portion of the float chamber; a float comprising an elongate member rotatably hinged within a float cavity of the fuel delivery insert, such that the float rises according to a quantity of fuel within the float chamber, the float being biased toward the bottom portion of the float chamber by way of a spring operating on the elongate mount; and a ventilation chamber in fluid communication with the float chamber and the carburetor, such that air is allowed to exit as liquid fuel enters the float chamber, wherein the ventilation chamber is configured to prevent the liquid fuel from entering into the carburetor; wherein the fuel inlet valve supplies liquid fuel to the float chamber by way of the at least one passage according to the operation of the float within the float chamber.

In another exemplary embodiment, the rigid body further comprises windows for viewing a position of the float within the float chamber. In another exemplary embodiment, the fuel inlet valve comprises a needle and seat, whereby the elongate member operates the fuel inlet valve by raising and lowering the needle according to the fuel level within the float chamber. In another exemplary embodiment, the fuel chamber is shaped to allow the entirety of the fuel chamber to fill with liquid fuel so as to substantially eliminate fuel aeration within the float chamber, thereby ensuring that one or more calibrated orifices within the float chamber receive a steady supply of substantially unaerated liquid fuel. In another exemplary embodiment, the ventilation chamber is configured to allow the float chamber to fill with liquid fuel while substantially preventing liquid fuel from being drawn into the carburetor.

In another exemplary embodiment, the fuel delivery insert comprises an inlet valve seat passing from a top of the fuel delivery insert to the float cavity, the inlet valve seat being configured to receive the fuel inlet valve, such that a needle of the fuel inlet valve is in contact with the elongate member and a fuel outlet of the valve is aligned with the at least one passage. In another exemplary embodiment, the at least one passage extends from the inlet valve seat along a top of the fuel delivery insert, then extends along a back side of the fuel delivery insert, and then extends along the bottom of the fuel delivery insert to the bottom portion of the float chamber. In another exemplary embodiment, along the bottom of the fuel delivery insert, the at least one passage separates into two individual passages extending to the bottom portion of the float chamber. In another exemplary embodiment, the at least one passage comprises dimensions and directions selected to facilitate fabricating the fuel delivery insert out of a solid work piece. In another exemplary embodiment, the float cavity comprises a height and a width suitable to allow unobstructed movement of the elongate member as the float moves from the bottom portion to a top portion of the float chamber.

In an exemplary embodiment, an apparatus for a fuel system for providing a mixture of liquid fuel and air to an intake manifold of an internal combustion engine comprises a carburetor mounted onto the intake manifold by way of a spacer and suitable fasteners; one or more fuel bowls operating as a reservoir of liquid fuel for use by the carburetor during operation of the internal combustion engine, each of the one or more fuel bowls being fastened to the carburetor by way of suitable fasteners and a spacer; and a throttle linkage system facilitating operating the carburetor and the one or more fuel bowls to supply the mixture of liquid fuel and air to the intake manifold, thereby controlling the operation of the internal combustion engine.

In another exemplary embodiment, each of the one or more fuel bowls comprises a float chamber, a fuel delivery insert, a float rotatably hinged within the float chamber, and a ventilation chamber, the fuel delivery insert configured to receive a fuel inlet valve and comprising at least one passage to direct incoming fuel from the fuel inlet valve to a bottom portion of the float chamber, the float being in operative communication with a fuel inlet value to maintain a quantity of fuel within the float chamber, the ventilation chamber being in communication with the float chamber and the carburetor, such that air is allowed to exit as liquid fuel enters the float chamber, wherein the ventilation chamber is configured to prevent the liquid fuel from entering into the carburetor. In another exemplary embodiment, the float operates the fuel inlet valve by raising and lowering a needle within the fuel inlet valve according to the fuel level within the float chamber. In another exemplary embodiment, the fuel chamber is shaped to allow the entirety of the fuel chamber to fill with liquid fuel so as to substantially eliminate fuel aeration within the float chamber, thereby ensuring that one or more calibrated orifices within the float chamber receive a steady supply of substantially unaerated liquid fuel.

In an exemplary embodiment, a method for reducing aeration of liquid fuel within a fuel bowl of a carburetor comprises passing aerated fuel exiting a fuel inlet valve through one or more passages suitably dimensioned to allow the fuel to return to an unaerated state; directing unaerated liquid fuel from the one or more passages into a bottom portion of a float chamber; filling the entirety of the float chamber with the unaerated liquid field venting air and fuel vapors within the float chamber into a ventilation chamber; and allowing the air and fuel vapors to pass from the ventilation chamber into the carburetor.

In another exemplary embodiment, directing aerated fuel through the one or more passages causes the fuel to condense back to a liquid state before entering the float chamber. In another exemplary embodiment, filling the entirety of the float chamber substantially ensures that one or more calibrated orifices receive a steady supply unaerated liquid fuel. In another exemplary embodiment, venting air and fuel vapors comprises allowing the air and fuel vapors to exit the float chamber to a ventilation chamber as liquid fuel fills the float chamber. In another exemplary embodiment, allowing the air and fuel vapors to pass from the ventilation chamber into the carburetor further comprises preventing liquid fuel from being drawn into the carburetor. In another exemplary embodiment, passing aerated fuel further comprises placing the fuel inlet valve into operative communication with a float, such that the float operates the fuel inlet valve so as to maintain a quantity of liquid fuel within the float chamber.

BRIEF DESCRIPTION OF THE DRAWINGS

The drawings refer to embodiments of the present invention in which:

FIG. 8A is a perspective view of a back side of an exemplary embodiment of a fuel delivery insert, according to the present disclosure; and FIG. 8B is a perspective view of a front side of an exemplary embodiment of a fuel delivery insert in accordance with the present disclosure.

Figure 1:
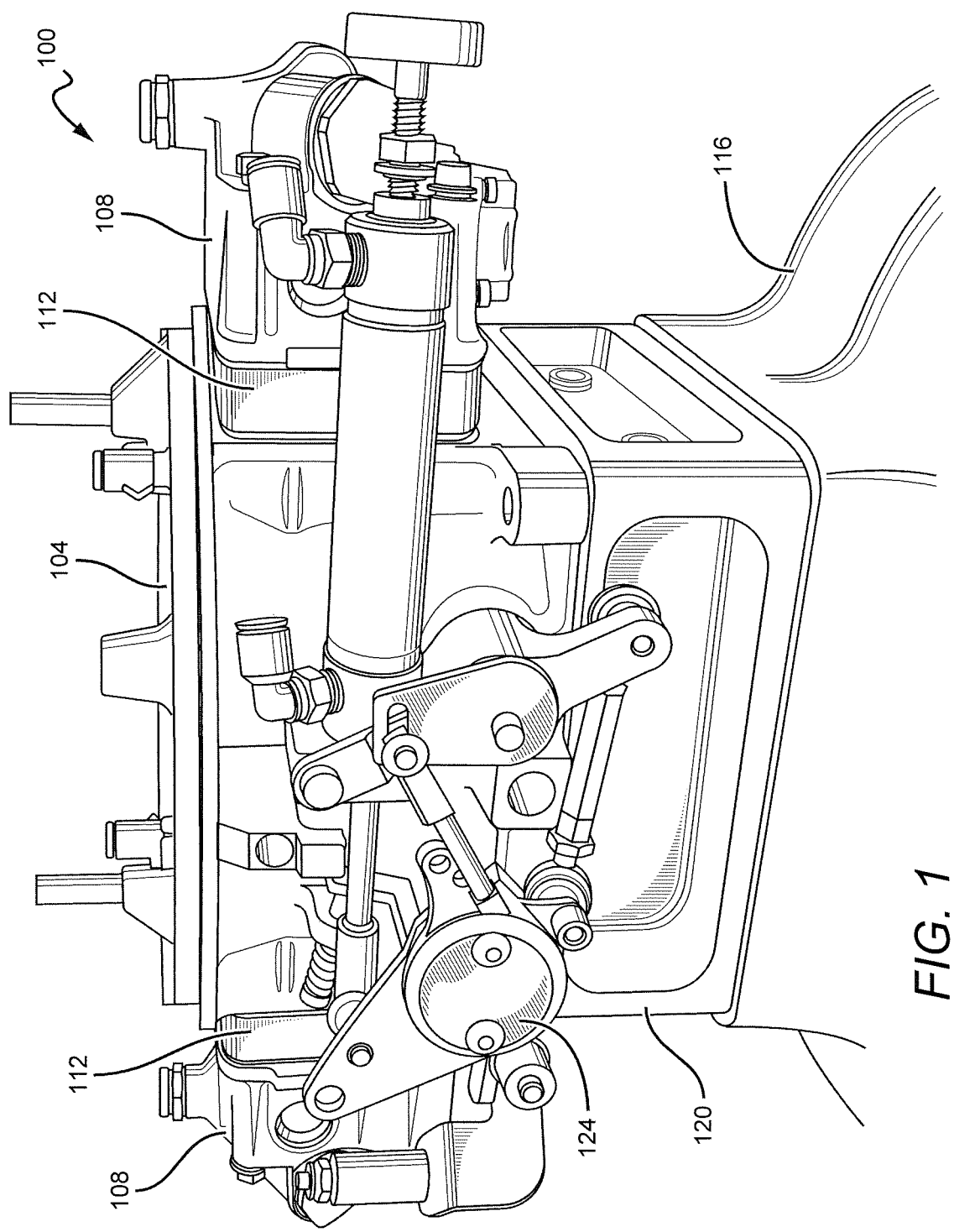
FIG. 1 illustrates an exemplary embodiment of a fuel system comprising a carburetor and two fuel bowls, according to the present disclosure.

While the present invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present invention.

DETAILED DESCRIPTION

In the following description, numerous specific details are set forth in order to provide a thorough understanding of the present invention. It will be apparent, however, to one of ordinary skill in the art that the present invention may be practiced without these specific details. In other instances, specific numeric references such as "first vent," may be made. However, the specific numeric reference should not be interpreted as a literal sequential order but rather interpreted that the "first vent" is different than a "second vent." Thus, the specific details set forth are merely exemplary. The specific details may be varied from and still be contemplated to be within the spirit and scope of the present invention. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present invention describes an apparatus and a method for a fuel bowl to supply liquid fuel to a carburetor. The fuel bowl comprises a float chamber and a fuel inlet cavity which receives a fuel delivery insert. The fuel delivery insert receives a fuel inlet valve and comprises passages to direct incoming fuel to a bottom portion of the float chamber. A float comprises an elongate member rotatably hinged within a float cavity of the fuel delivery insert, such that the float rises according to a quantity of fuel within the float chamber. The fuel inlet valve supplies liquid fuel to the float chamber by way of the passages according to the operation of the float within the float chamber. A ventilation chamber allows air and fuel vapors to exit as liquid fuel enters the float chamber while preventing liquid fuel from entering into the carburetor.

FIG. 1 illustrates an exemplary embodiment of a fuel system 100 comprising a carburetor 104 and two fuel bowls 108, according to the present invention. Each of the fuel bowls 108 is fastened to the carburetor 104 by way of suitable fasteners and a spacer 112. Those skilled in the art will recognize that the fuel bowl 108 operates as a reservoir of liquid fuel for use by the carburetor 104 during operation of an internal combustion engine (ICE). The carburetor 104 is mounted onto an intake manifold 116 of the ICE by way of suitable fasteners and a spacer 120. A throttle linkage system 124 facilitates using the carburetor 104 and fuel bowls 108 to supply a suitable mixture of air and fuel to the ICE, thereby enabling an operator of the fuel system 100 to control the speed and power output of the ICE.

Figure 2:
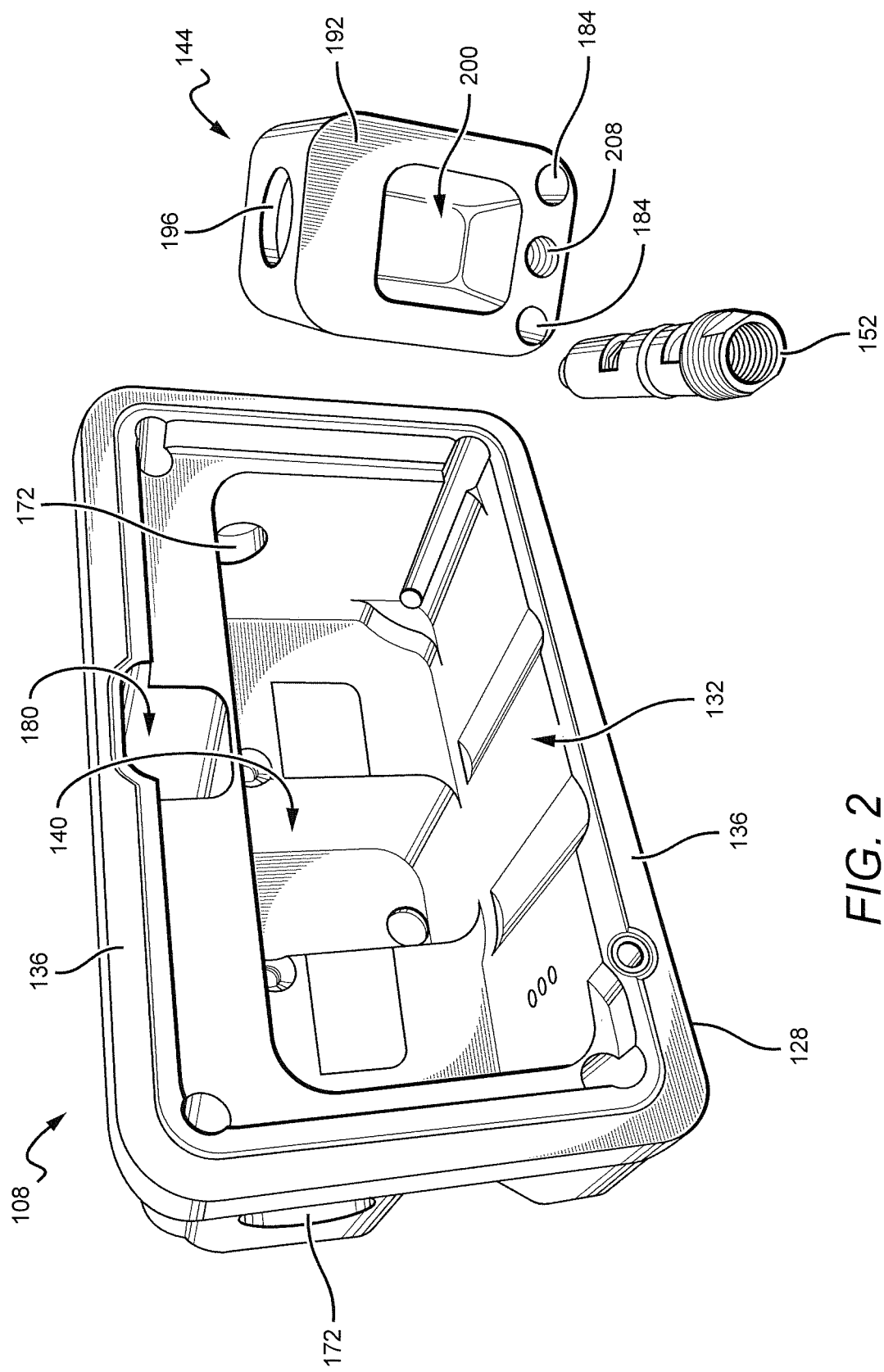
FIG. 2 is a perspective view of an exemplary embodiment of a fuel bowl and a fuel delivery insert in accordance with the present disclosure.
Figure 3:
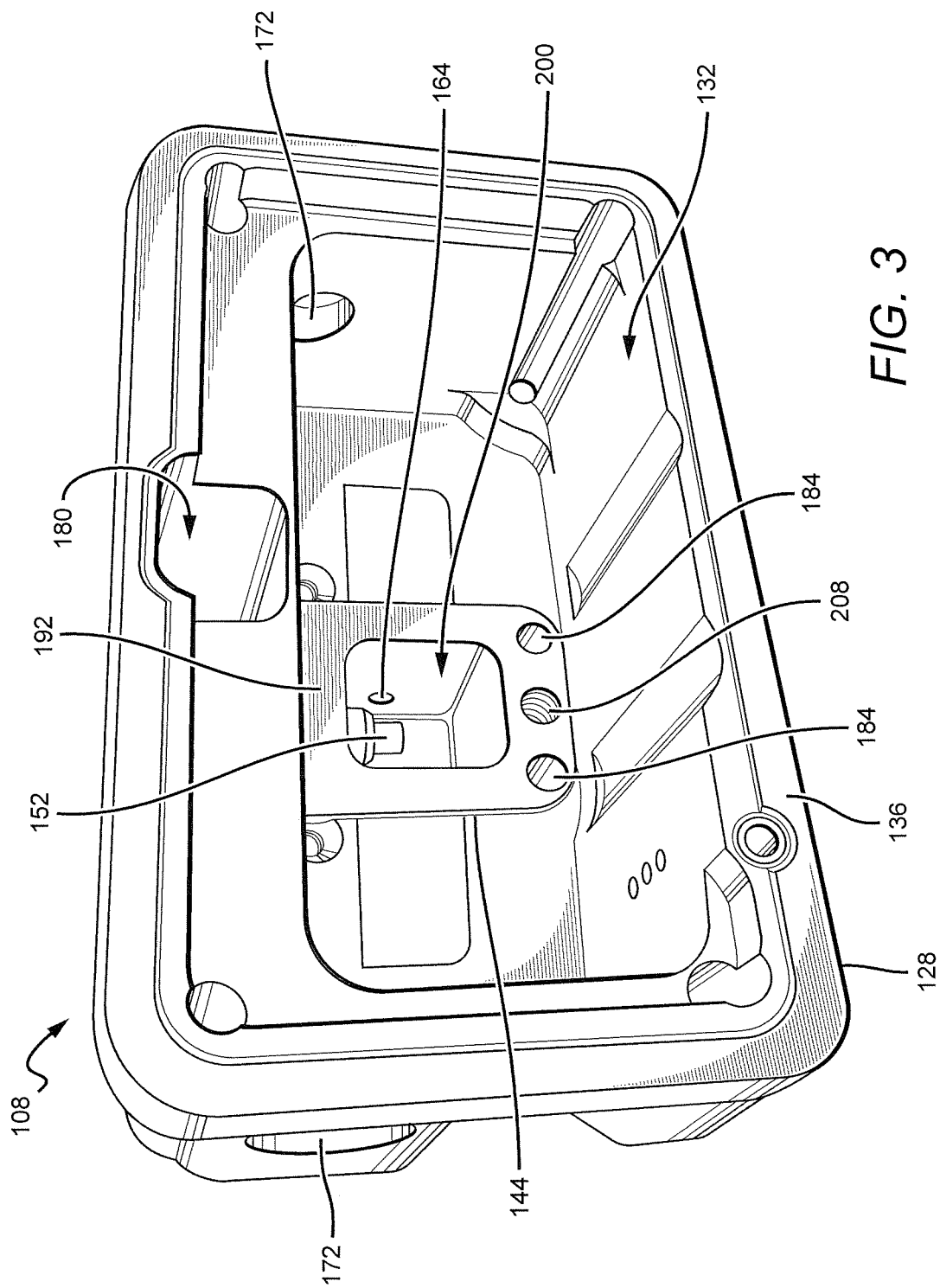
FIG. 3 is a perspective view of an exemplary embodiment of a fuel bowl and a fuel delivery insert in accordance with the present disclosure.
Figure 4:
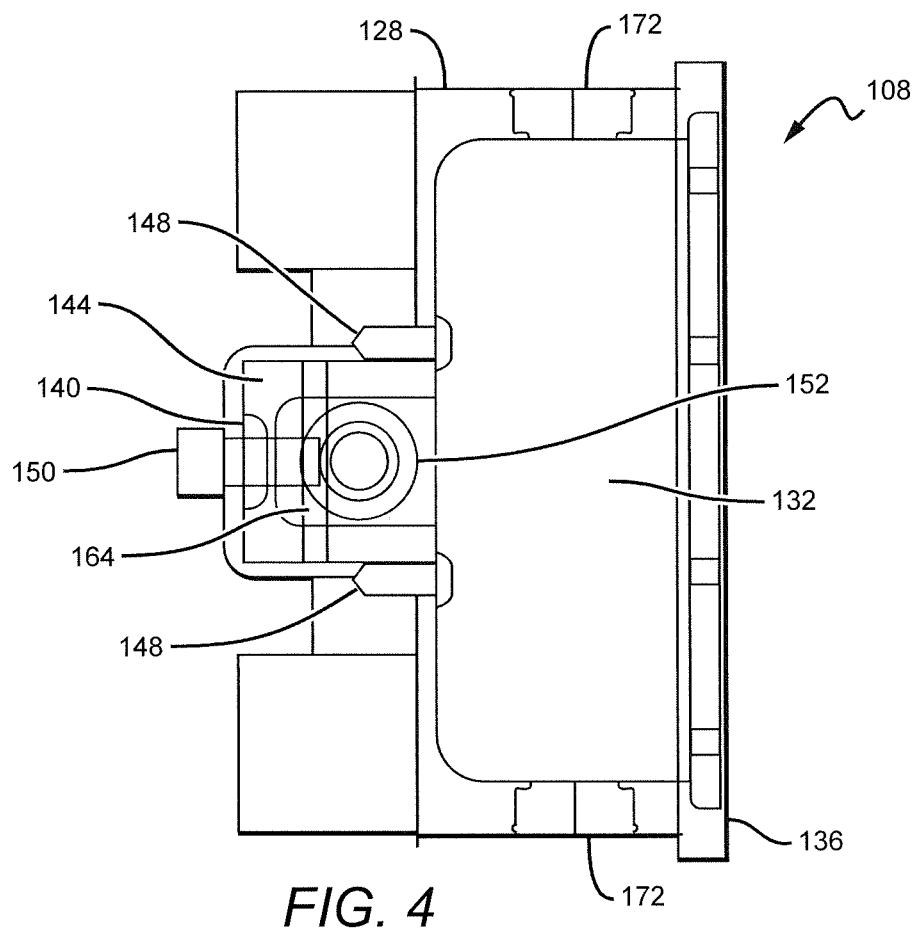
FIG. 4 illustrates a top ghost view of an exemplary embodiment of the fuel bowl in accordance with the present disclosure.
Figure 5:
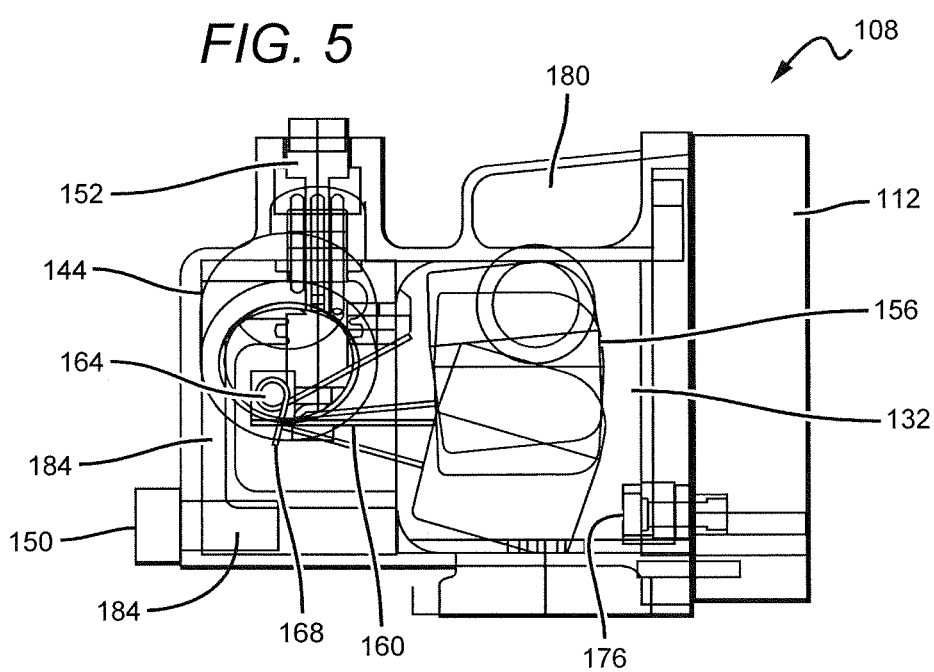
FIG. 5 illustrates a side ghost view of an exemplary embodiment of a fuel bowl, according to the present disclosure.

FIGS. 2-3 are perspective views of an exemplary embodiment of the fuel bowl 108 in accordance with the present disclosure. The fuel bowl 108 generally comprises a rigid body 128 which includes a float chamber 132, a mounting plate 136, and a fuel inlet cavity 140. Preferably, the rigid body 128 is formed of a material amenable to being machined, such as any of a variety of metals. In an embodiment, the metal comprising the rigid body 128 is 6061 aluminum. The mounting plate 136 is configured to be received by the spacer 112 and suitable fasteners, such that the fuel bowl 108 and the spacer 112 may be fastened to the carburetor 104, as illustrated in FIG. 1. The fuel inlet cavity 140 is configured to receive a fuel delivery insert 144 as shown in FIG. 3. As best shown in FIGS. 4 and 5, the fuel delivery insert 144 is retained within the fuel inlet cavity 140 by way of fasteners 148 and 150.

Figure 6:
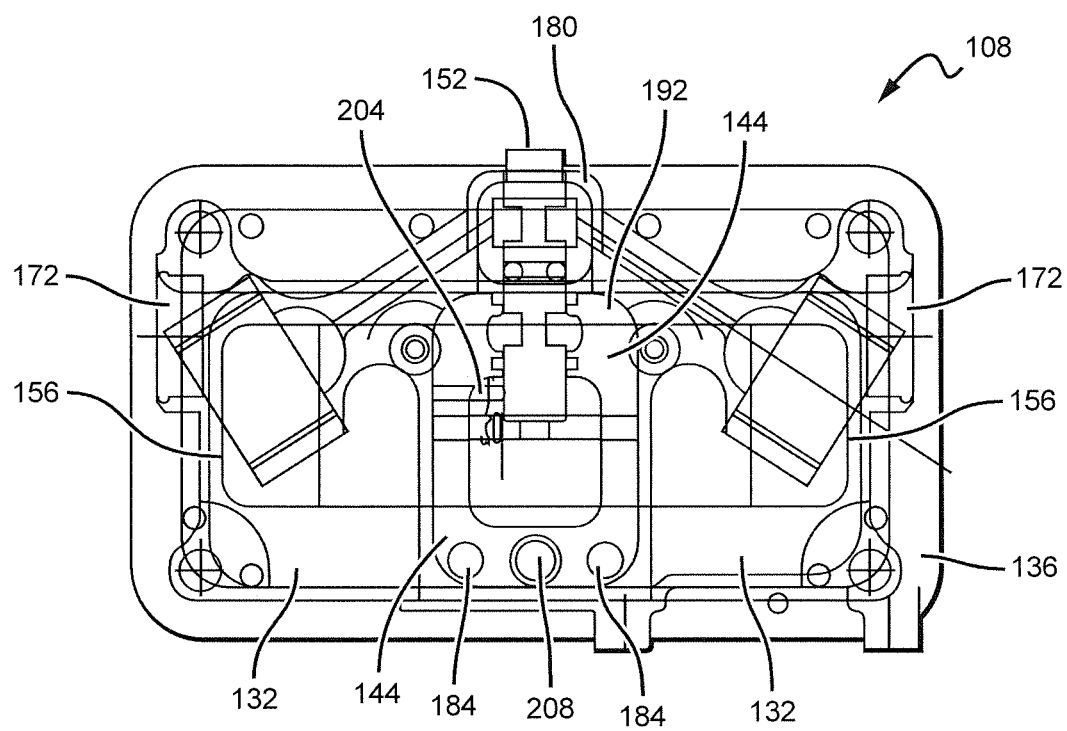
FIG. 6 illustrates a front ghost view of an exemplary embodiment of a fuel bowl, according to the present disclosure.
Figure 7:
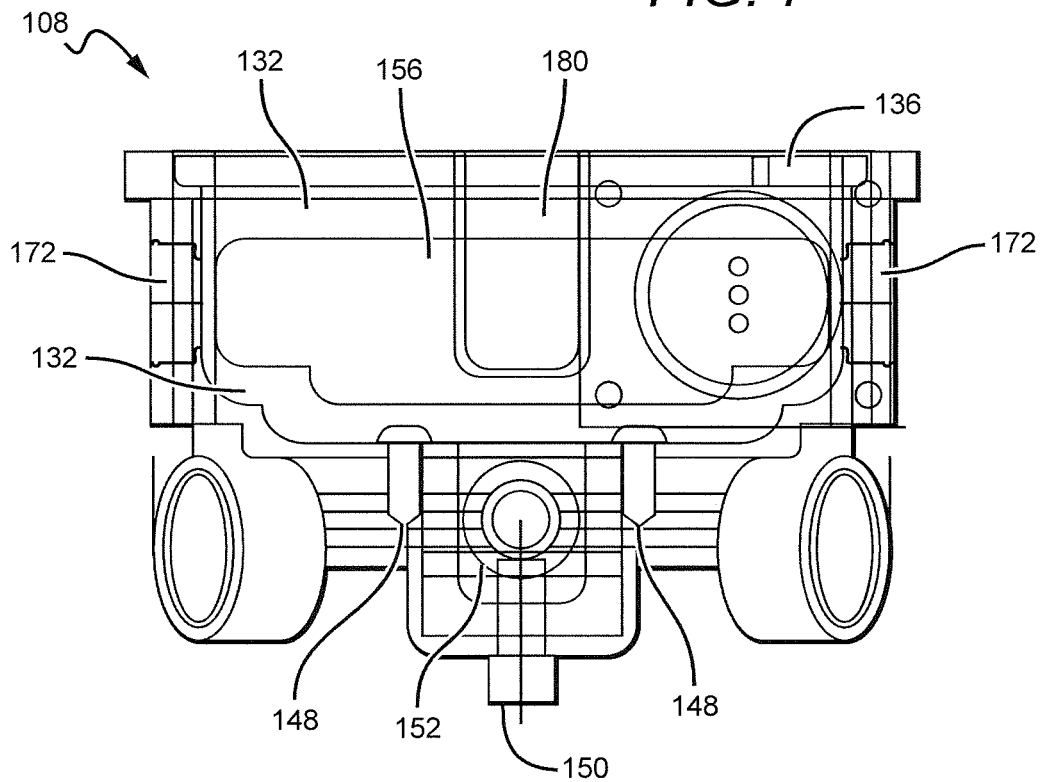
FIG. 7 illustrates a bottom ghost view of an exemplary embodiment of a fuel bowl in accordance with the present disclosure.

As discussed in greater detail below, the fuel delivery insert 144 receives a fuel inlet valve 152 configured to supply liquid fuel to the float chamber 132 according to the operation of a float 156 housed within the float chamber 132. As best illustrated in FIG. 5, a side ghost view of the fuel bowl 108, the float 156 comprises an elongate member 160 which is rotatably attached to a float mount 164 within the fuel delivery insert 144. The float mount 164 generally comprises a shaft inserted into holes within the side walls of the fuel delivery inert 144, as shown in FIGS. 5-6. A spring 168 biases the elongate member 160 toward a bottom portion of the float chamber 132, such that the float 156 rises and drops strictly in accordance with the level of fuel in the float chamber 132. As will be appreciated by those skilled in the art, the level and operation of the float 156 may be directly observed by way of windows 172 disposed in the walls of the float chamber 132.

The fuel inlet valve 152 preferably is of the needle & seat variety, whereby the elongate member 160 operates the fuel inlet valve 152 by raising and lowering the needle according to the fuel level within the float chamber 132. As fuel is drawn out of the float chamber 132 by way of one or more calibrated orifices 176, or jets, the float 156 drops downward as the level of fuel within the float chamber 132 decreases. As best illustrated in FIG. 5, when the float 156 assumes a low position within the float chamber 132, the elongate member 160 lowers the needle which allows fuel to flow through the fuel inlet valve 152 into the fuel bowl 108. As fuel enters the fuel bowl 108, the float 156 rises in the float chamber 132 until the elongate member 160 shuts off the flow of fuel through the fuel inlet valve 152. A ventilation chamber 180 allows air to exit the fuel chamber 132 as the fuel level rises.

As will be appreciated by those skilled in the art, conventional fuel bowls are designed to maintain an airspace above the float, while ventilation tubes allow excess air to exit the float chamber and enter the carburetor. Maintaining an airspace above the float allows liquid fuel to vaporize within the float chamber, thereby reducing the density of the fuel provided by the fuel bowl to the carburetor. Unlike conventional fuel bowls, however, the fuel chamber 132 of the present disclosure is advantageously shaped to allow the entirety of the fuel chamber 132 to fill with liquid fuel, thereby eliminating fuel aeration within the float chamber 132. Further, the ventilation chamber 180 allows the float chamber 132 to fill completely with liquid fuel while advantageously preventing liquid fuel from sloshing into the carburetor 104. As will be appreciated by those skilled in the art, the ventilation chamber 180 preferably is not completely closed off from the float chamber 132, but rather the ventilation chamber 180 is isolated from liquid fuel in the float chamber 132 while allowing air and fuel vapors to escape from the float chamber 132 into the ventilation chamber 180. In an embodiment, the spacer 120 operates as a metering block comprising a baffle that covers a lower portion of the ventilation chamber 180, thereby allowing air and fuel vapor to pass around the baffle and enter into the ventilation chamber 180 while substantially preventing the passage of liquid fuel. The air and fuel vapors in the ventilation chamber 180 are then passed to the carburetor 104 by way of suitable passageways in the spacer 120.

As mentioned above, the fuel delivery insert 144 is retained within the fuel inlet cavity 140 by way of the fasteners 148 and 150. The fuel delivery insert 144 serves a dual function of placing the elongated member 160 in mechanical communication with the fuel inlet valve 152 and directing incoming liquid field to a bottom portion of the float chamber 132. Those skilled in the art will recognize that liquid fuel typically flows from a fuel regulator at a pressure ranging between 3 PSI and 10 PSI before passing though the fuel inlet valve 152. Liquid fuel existing the needle & seat of the fuel inlet valve 152 has a tendency to become aerated with fuel vapors within the fuel bowl. The fuel vapors reduce the density of the fuel residing within the float chamber 132 and ultimately entering into the ICE by way of the carburetor 104. In the embodiment illustrated in FIGS. 2-7, however, the fuel delivery insert 144 directs fuel exiting the fuel inlet valve 152 through passages 184 to the bottom of the float chamber 132. It will be appreciated that directing aerated fuel through the passages 184 causes the fuel to condense back to a liquid state before entering the float chamber 132. It will be further appreciated that directing only liquid fuel to the float chamber 132 advantageously ensures that the calibrated orifices 176 receive a steady supply unaerated liquid fuel.

FIGS. 8A and 8B illustrate an exemplary embodiment of the fuel delivery insert 144 in absence of the fuel bowl 108. FIG. 8A is a perspective view of a back side 188 of the fuel delivery insert 144 which contacts a rear interior surface of the fuel inlet cavity 140 when installed into the fuel bowl 108, as illustrated in FIGS. 2-7. FIG. 8A illustrates a path of the passages 184 along the back side 188 of the fuel delivery insert 144. FIG. 8B is a perspective view of a front side 192 of the fuel delivery insert 144 which faces toward the float chamber 132 when installed into the fuel bowl 108, as shown in FIGS. 3-7.

As best shown in FIG. 8B, the fuel delivery insert 144 comprises an inlet valve seat 196 passing from a top of the fuel delivery insert 144 to a float cavity 200. The float cavity 200 comprises the float mount 164 and a spring retainer 204. As discussed above, the float mount 164 is configured to receive the rotatably mounted elongate member 160, and the spring 168 biases the elongate member 160 toward a bottom portion of the float chamber 132. The spring retainer 204 is configured to ensure that the spring 168 maintains a suitable degree of force on the elongate member 160 throughout the range of motion of the float 156 within the float chamber 132. In the embodiment illustrated in FIGS. 8A-8B, the spring retainer 204 comprises a hole into which either an end of the spring 168 may be inserted or various fasteners suitable for holding the end of the spring fixed within the float cavity 200, as illustrated in FIGS. 5-6. It will be appreciated that the float cavity 200 possesses a height and a width suitable to enable unobstructed movement of the elongate member 160 as the float 156 moves from the bottom portion to a top portion of the float chamber 132.

The inlet valve seat 196 is configured to receive the fuel inlet valve 152, such that a needle of the fuel inlet valve 152 is in contact with the elongate member 160, as shown in FIGS. 3-7, and a fuel outlet of the valve is aligned with the passages 184. As discussed above, movement of the elongate member 160 moves the needle, thereby controlling fuel flow from the inlet valve 152 into the passages 184. Accordingly, it will be appreciated that the inlet valve seat 196 may comprise one or more seals suitably configured to prevent liquid fuel from bypassing the passages 184 and draining into the float cavity 200. In the embodiment illustrated in FIGS. 2-3, the inlet valve seat 196 is configured to receive a fuel inlet valve which comprises preinstalled seals. It should be understood that the inlet valve seat 196 preferably is designed and machined in accordance with dimensions of the specific fuel inlet valve intended to be coupled with the fuel delivery insert 144, and thus the fuel delivery insert 144 may be implemented with a wide variety of inlet valve seats 196 comprising various diameters, depths, shapes, ridges, lips, protrusions, seals, and the like without deviating from the spirit and scope of the present disclosure.

In the embodiment of FIGS. 8A-8B, the passage 184 extends from the inlet valve seat 196 toward the back side 188 of the fuel delivery insert 144. As best shown in FIG. 8A, the passage 184 extends along the back side 188 and then separates into two individual passages 184 toward a bottom of the fuel delivery insert 144. Along the bottom of the fuel delivery insert 144, the passages 184 are positioned on opposite sides of a threaded bolt hole 208 which is suitably configured to receive the fastener 150. In the illustrated embodiment of the fuel delivery insert 144, the passage 184 comprises an open portion 212 along the back side 188. It will be appreciated that upon installing the fuel delivery insert 144 into the fuel inlet cavity 140, the open portion 212 is covered by a rear surface of the fuel inlet cavity 140. It will be further appreciated that the open portion 212 serves to simplify fabricating the fuel delivery insert 144 out of a solid work piece, such as by way of non-limiting example, machined billet aluminum, machined 6061 aluminum, and the like. It is to be understood that the specific dimensions and directions of the passages 184 may be altered from those illustrated in FIGS. 8A-8B without deviating from the spirit and scope of the present disclosure.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present invention is to be understood as not limited by the specific embodiments described herein, but only by scope of the appended claims.

What is claimed is:

1. A fuel bowl assembly to supply liquid fuel to a carburetor, comprising:

a rigid body comprising a float chamber, a fuel inlet cavity, and a mounting plate configured to fasten the fuel bowl assembly to the carburetor, such that the fuel bowl is in fluid communication with the carburetor;

a fuel delivery insert configured to be fastened within the fuel inlet cavity, the fuel delivery insert configured to receive a fuel inlet valve and comprising at least one passage to direct incoming fuel to a bottom portion of the float chamber;

a float comprising an elongate member rotatably hinged within a float cavity of the fuel delivery insert, such that the float rises according to a quantity of fuel within the float chamber, the float being biased toward the bottom portion of the float chamber by way of a spring operating on the elongate mount, wherein the rigid body further comprises one or more windows for viewing a position of the float within the float chamber;

a ventilation chamber in fluid communication with the float chamber and the carburetor, such that air is allowed to exit as liquid fuel enters the float chamber, wherein the ventilation chamber is configured to prevent the liquid fuel from entering into the carburetor and to allow the float chamber to fill with liquid fuel while substantially preventing liquid fuel from being drawn into the carburetor; and wherein the fuel inlet valve supplies liquid fuel to the float chamber by way of the at least one passage according to the operation of the float within the float chamber.

2. The fuel bowl of claim 1, wherein the fuel inlet valve comprises a needle and seat, whereby the elongate member operates the fuel inlet valve by raising and lowering the needle according to the fuel level within the float chamber.

3. The fuel bowl of claim 1, wherein the fuel chamber is shaped to allow the entirety of the fuel chamber to fill with liquid fuel so as to substantially eliminate fuel aeration within the float chamber, thereby ensuring that one or more calibrated orifices within the float chamber receive a steady supply of substantially unaerated liquid fuel.

4. The fuel bowl of claim 1, wherein the fuel delivery insert comprises an inlet valve seat passing from a top of the fuel delivery insert to the float cavity, the inlet valve seat being configured to receive the fuel inlet valve, such that a needle of the fuel inlet valve is in contact with the elongate member and a fuel outlet of the valve is aligned with the at least one passage.

5. The fuel bowl of claim 1, wherein the at least one passage extends from the inlet valve seat along a top of the fuel delivery insert, then extends along a back side of the fuel delivery insert, and then extends along the bottom of the fuel delivery insert to the bottom portion of the float chamber.

6. The fuel bowl of claim 5, wherein along the bottom of the fuel delivery insert, the at least one passage separates into two individual passages extending to the bottom portion of the float chamber.

7. The fuel bowl of claim 5, wherein the at least one passage comprises dimensions and directions selected to facilitate fabricating the fuel delivery insert out of a solid work piece.

8. The fuel bowl of claim 5, wherein the float cavity comprises a height and a width suitable to allow unobstructed movement of the elongate member as the float moves from the bottom portion to a top portion of the float chamber.

9. A method for reducing aeration of liquid fuel within a fuel bowl of a carburetor, comprising:
passing aerated fuel exiting a fuel inlet valve through one or more passages suitably dimensioned to allow the fuel to return to an unaerated state;
wherein the fuel bowl is fastened to the carburetor by way of a plurality of fasteners and a spacer;
directing unaerated liquid fuel from the one or more passages into a bottom portion of a float chamber;
filling the entirety of the float chamber with the unaerated liquid field;
venting air and fuel vapors within the float chamber into a ventilation chamber; and
allowing the air and fuel vapors to pass from the ventilation chamber into the carburetor.

10. The method of claim 9, wherein directing aerated fuel through the one or more passages causes the fuel to condense back to a liquid state before entering the float chamber.

11. The method of claim 9, wherein filling the entirety of the float chamber substantially ensures that one or more calibrated orifices receive a steady supply unaerated liquid fuel.

12. The method of claim 9, wherein venting air and fuel vapors comprises allowing the air and fuel vapors to exit the float chamber to a ventilation chamber as liquid fuel fills the float chamber.

13. The method of claim 9, wherein allowing the air and fuel vapors to pass from the ventilation chamber into the carburetor further comprises preventing liquid fuel from being drawn into the carburetor.

14. The method of claim 9, wherein passing aerated fuel further comprises placing the fuel inlet valve into operative communication with a float, such that the float operates the fuel inlet valve so as to maintain a quantity of liquid fuel within the float chamber.

* * * * *